Feb. 20, 1934.   C. SCHLARED   1,947,804
ANTIGLARE DEVICE FOR MOTOR VEHICLE HEADLIGHTS
Filed Nov. 11, 1932
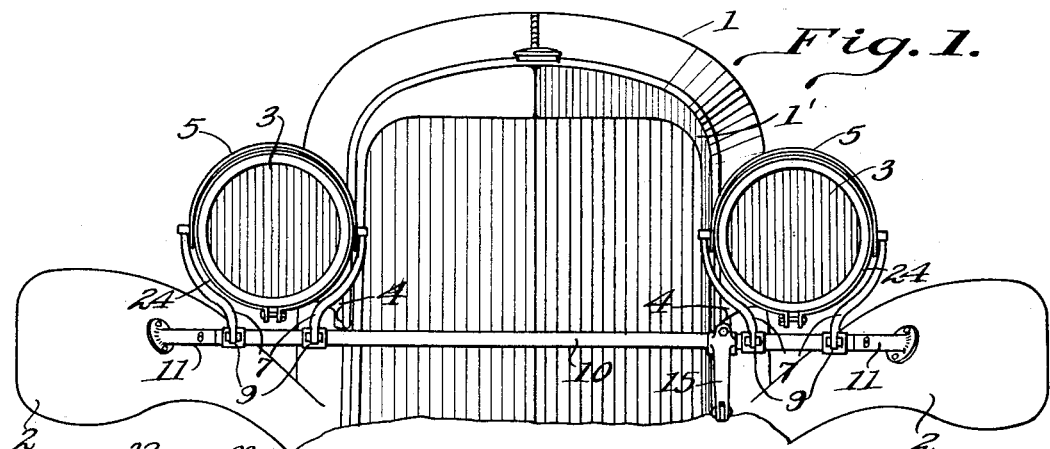
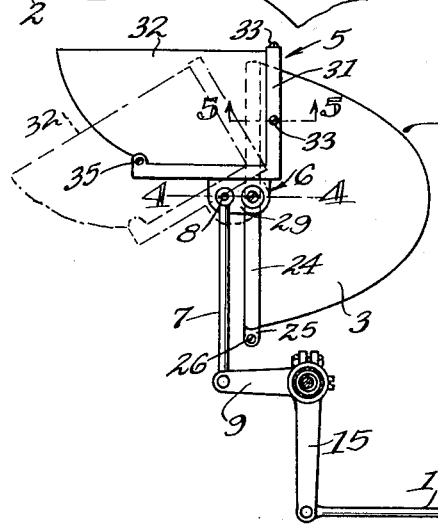
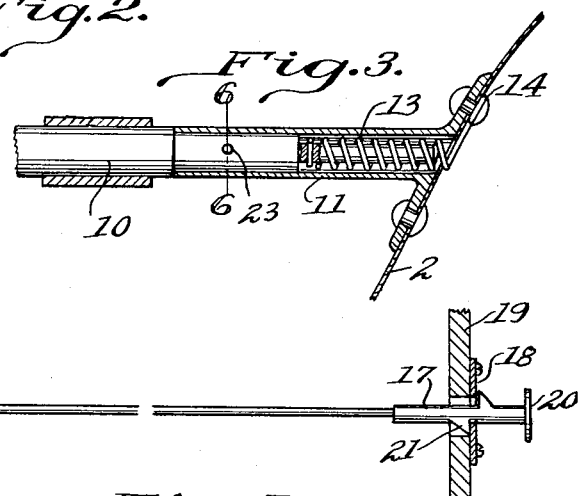
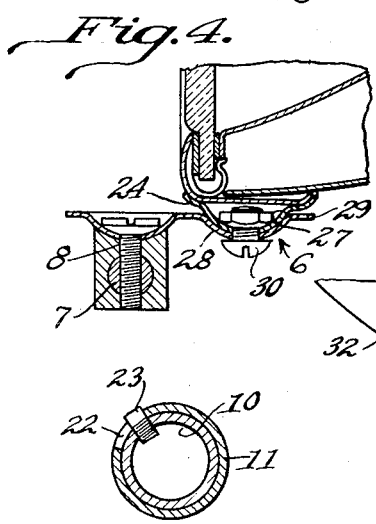
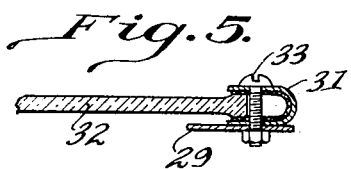
Inventor
C. Schlared
By W. S. McDowell
Attorney Patented Feb. 20, 1934

1,947,804

UNITED STATES PATENT OFFICE 1,947,804

ANTIGLARE DEVICE FOR MOTOR VEHICLE HEADLIGHTS

Charles Schlared, Columbus, Ohio, assignor of one-half to Adolphus Viney, Columbus, Ohio Application November 11, 1932, Serial No. 642,262

2 Claims. (Cl. 240—45.6)

This invention relates to new and useful improvements in attachments for motor vehicle headlights, and has for its main object to provide a device which will effectively screen the headlights to prevent the light rays thereof from glaring into the eyes of oncoming drivers or pedestrians and yet at the same time provide adequate light for the driver of the vehicle carrying the device.

Another object of the invention is to provide pivoted screens or visors which may be operated from the drivers seat by a simple manipulation so that the headlights may be substantially covered or uncovered as location may require.

A further object is to provide a simple and effective device including colored visors, preferably green, which may be swung to positions in front of the headlights for producing colored light beams thereby eliminating glare which would otherwise interfere with the safe driving of oncoming vehicles, and yet produce light of sufficient strength to enable the driver of the vehicle, on which the device is installed, to clearly view the roadway without slowing down the speed of the vehicle.

It is a further object to make the device simple in construction, inexpensive to manufacture, and easily applied to a motor vehicle of standard make.

The invention consists in certain novel combinations and arrangements of parts involving the adjustable visors and the manually controlled operating means thereof which will hereinafter be more fully described in the specification and set forth in the appended claims.

In the accompanying drawing:

Fig. 1 is a front elevation of a portion of the vehicle showing the anti-glare attachment comprising the present invention installed in connection with the headlamps of the vehicle;

Fig. 2 is a side elevation of one of the headlamps showing a visor mounted thereon and the mechanism for operating the same;

Fig. 3 is an enlarged detail vertical sectional view taken through one end of the operating shaft used in connection with the present invention;

Fig. 4 is a horizontal detail sectional view taken on the line 4—4 of Fig. 2;

Fig. 5 is a similar view taken on the line 5—5 of Fig. 2;

Fig. 6 is a vertical transverse sectional view taken on the line 6—6 of Fig. 3;

Fig. 7 is a detail view showing the method of holding the visor proper in connection with its receiving frame.

Referring more particularly to the drawing, the numeral 1 designates a motor vehicle which includes the usual radiator 1' and the front fenders 2. Positioned as customary between the sides of the radiator shell and the fenders are the headlamps 3 which may be of the usual design and, for the purpose of illustration only, have been shown attached to the radiator shell by supporting brackets 4. Carried by the lamps 3 are hoods or visors generally indicated by the numeral 5 and pivoted as at 6 in connection with the lamps. To swing these visors from a raised to a light obstructing position, a pair of links 7 are provided with each of the visors which have their upper ends pivoted as at 8 in connection with the visor and their lower ends pivotally connected to spaced arms 9 carried by an operating member or shaft 10. This shaft or member extends between the fenders 2 and has its ends arranged within bearing sleeves 11 attached to said fenders. The outer reduced ends of the member 10 are provided with springs 13 which have one of their ends secured to the shaft and their other ends connected as at 14 to the fenders. Also carried by the member 10 is an arm 15 which has its lower end pivotally connected to an operating rod 16 extending to a point adjacent the driver's position on the vehicle. The manipulating end 17 of the rod 16 projects through a slotted plate 18 which is attached to the dash board construction 19 of the vehicle and the end 17 of the rod is provided with a foot piece 20 and with a shouldered projection 21 which normally engages the plate 18 to hold the visors in their raised or lens uncovering position.

It will be seen that by raising the manipulating end 17 of the rod 16 so that the projection 21 clears the plate 18, the shaft or member 10 will be free to rotate by the action of the spring 13 so as to rock the visors to light beam obstructing positions, as indicated by dotted lines in Fig. 2. The springs 13 are so wound or tensioned that they will quickly move the visors to their lowered positions and hold the same firmly without rattling and when raised, additional tension is put on the springs which will serve to take up all slack in the connecting joints of the levers and arms. To limit the amount of rocking movement in either direction of the visors, the bearing sleeves 11 are provided with slots 22 in which are received projections or pins 23 carried by the shaft member 10.

Each of the visors 5 comprises a circular band 24 which is mounted upon the lens ring of the headlamp and provided with spaced ears 25 for the reception of a clamping bolt 26 by which the band may be brought into firm relationship with said lens ring. The band 24 is formed with diametrically arranged rounded projections 27 which cooperate with similar projections or depressions 28 provided upon an arcuate frame 29 and extending through the projections 27 and 28 are bolts 30 which together with said projections constitute the pivots 6 for the visor. Attached to the frame 29 is a channel shaped frame 31 which is L-shaped when viewed in side elevation and receives the rear and lower edges of the visor member or shield 32 formed preferably of green transparent glass although it will be understood that other substances and colors may be used. The frames 29 and 31 are held together by screws 33 which also serve to hold the visor 32 in place. To prevent the visor or shield from slipping forward, the side edges thereof are provided with shoulders 34 which are arranged behind screws 35 connecting the sides of the channel shaped frame 31. By means of the frame 31 carried by the visor member, the latter may be removed for replacement or repair by simply removing the screws 33 and without disturbing the pivotal mounting for the visor.

From the foregoing, it will be seen that an anti-glare attachment has been provided including colored transparent visors which when brought into light obstructing positions will produce colored beams of light and prevent the dazzling rays thereof from glaring into the eyes of oncoming drivers or pedestrians. Due to the transparency of the visors, adequate driving lights are provided by which the driver of the vehicle carrying the device may clearly view the roadway to the front of him while passing oncoming vehicles.

The device, due to its simplicity and novel construction, may be quickly manipulated by a simple operation to raise or lower the visors as occasion may require and without change of position on the part of the driver. While I have shown and described what I consider to be the preferred embodiment of the invention, it is to be understood that slight changes may be made in the construction from time to time which will fall within the spirit and scope of the invention as set forth in the following claims.

What is claimed is:

1. An anti-glare attachment for a motor vehicle head lamp, comprising a frame pivotally carried by said head lamp, said frame including an arcuate portion, extending over the top of the lamp, and side portions projecting forward of the lamp at the sides thereof, said frame portions being channel shaped, an arcuate transparent visor extending forward of the lamp and having its rear and side edges received within the channels of said frame portions, and means extending through the side walls of said channels for clampingly holding the edges of the visor to said frame, said visor and frame being capable of downwardly tilting movement to obstruct light rays issuing from the uper portion of said head lamp.

2. An anti-glare attachment for a motor vehicle head lamp, comprising a frame pivotally carried by said head lamp, said frame including an arcuate portion extending over the top of the lamp and side portions projecting forward of the lamp at the sides thereof, said frame portions being channel shaped, an arcuate transparent visor extending forward of the lamp and having its rear and side edges received within the channels of said frame portions, shoulders formed at the forward ends of the side edges of said visor, means extending through the side walls of said channels and arranged forward of said shoulders to positively retain said visor within the channels of said frame, and means operable from the dash of said vehicle for effecting the tilting movement of said visor and frame to obstruct light rays issuing from the upper portion of said head lamp.

CHARLES SCHLARED.